(12) United States Patent
Tezuka et al.

(10) Patent No.: US 8,816,823 B2
(45) Date of Patent: Aug. 26, 2014

(54) ELECTROMAGNETIC WAVE TRANSMISSION SHEET, RADIO LAN SYSTEM, RFID SYSTEM, AND ELECTROMAGNETIC WAVE TRANSMISSION METHOD

(75) Inventors: Ken-Ichi Tezuka, Tokyo (JP); Naoya Asamura, Tokyo (JP); Hiroto Itai, Tokyo (JP)

(73) Assignee: Cell Cross Corporation, Tokyo (JP)

( * ) Notice: Subject to any disclaimer, the term of this patent is extended or adjusted under 35 U.S.C. 154(b) by 371 days.

(21) Appl. No.: 13/128,089

(22) PCT Filed: Sep. 15, 2009

(86) PCT No.: PCT/JP2009/004615
§ 371 (c)(1),
(2), (4) Date: May 6, 2011

(87) PCT Pub. No.: WO2010/052818
PCT Pub. Date: May 14, 2010

(65) Prior Publication Data
US 2011/0221547 A1    Sep. 15, 2011

(30) Foreign Application Priority Data
Nov. 6, 2008   (JP) ................................ 2008-285941

(51) Int. Cl.
*G06K 7/10* (2006.01)
*H01P 1/22* (2006.01)
*H01P 3/00* (2006.01)

(52) U.S. Cl.
CPC .............. *G06K 7/10366* (2013.01); *H01P 1/22* (2013.01); *H01P 3/00* (2013.01)
USPC ......................... 340/10.1; 333/81 R; 333/236

(58) Field of Classification Search
CPC .......... G06K 7/10366; H01P 1/22; H01P 3/00
USPC ........ 333/202, 236, 237, 239, 81 R; 343/756, 343/771, 776, 785, 789, 909, 912, 753; 455/523; 342/4, 5; 340/10.1
See application file for complete search history.

(56) References Cited

U.S. PATENT DOCUMENTS 2,684,469 A * 7/1954 Sensiper ...................... 333/81 B
2,908,875 A * 10/1959 Blatt et al. ................... 333/22 R
(Continued)

FOREIGN PATENT DOCUMENTS

| JP | 2007-082178 | 3/2007 |
| JP | 2007-150654 | 6/2007 |
| JP | 2007-281678 | 10/2007 |

OTHER PUBLICATIONS

D.M. Pozar, Microwave Engineering 4th Ed., Wiley, 2012, p. 109.*
(Continued)

*Primary Examiner* — Benny Lee
*Assistant Examiner* — Rakesh Patel
(74) *Attorney, Agent, or Firm* — Muncy, Geissler, Olds & Lowe, P.C.

(57) ABSTRACT

Provided is an electromagnetic wave transmission sheet having a mesh-shaped electrode. The sheet has a length of width in a direction vertical to the propagation direction of the transmitted electromagnetic wave which length is substantially identical to half of the wavelength of the transmitted electromagnetic wave multiplied by a natural number so that a resonance state is obtained in the vertical direction. It is preferable that the sheet have an electromagnetic wave absorbing medium for reducing reflection of the transmitted electromagnetic wave in the propagation direction, so as to eliminate the need of an electromagnetic wave absorbing medium for reducing reflection in the direction vertical to the propagation direction of the transmitted electromagnetic wave.

5 Claims, 9 Drawing Sheets

(56) References Cited

U.S. PATENT DOCUMENTS

| | | | |
|---|---|---|---|
| 4,688,007 A * | 8/1987 | Krill | 333/137 |
| 2005/0047356 A1 * | 3/2005 | Fujii et al. | 370/311 |
| 2007/0194932 A1 * | 8/2007 | Oishi et al. | 340/572.7 |
| 2008/0238796 A1 * | 10/2008 | Rofougaran | 343/776 |

OTHER PUBLICATIONS

Itai, et al., "Method of Simultaneous Signal-Power Transmission Using Surface Microwave", The Institute of Electronics Information and Communication Engineers, vol. 107, No. 53(May 17, 2007) pp. 115-118 (May 25, 2007).

* cited by examiner

FIG.6

| NUMBER | ITEM | VALUE |
|---|---|---|
| 1 | MESH | SQUARE LATTICE |
| 2 | MESH PITCH | 7mm |
| 3 | MESH LINE WIDTH | 1mm |
| 4 | DIELECTRIC LAYER | POLYPROPYLENE |
| 5 | THICKNESS OF DIELECTRIC LAYER | 2mm |
| 6 | RELATIVE PERMITTIVITY OF DIELECTRIC LAYER | 1.4 |

FIG.7

| NUMBER | ITEM | VALUE |
|---|---|---|
| 1 | VOLUME RESISTIVITY | 10 Ω m |
| 2 | COMPLEX RELATIVE PERMEABILITY (2-GHz BAND) | 7+4j |

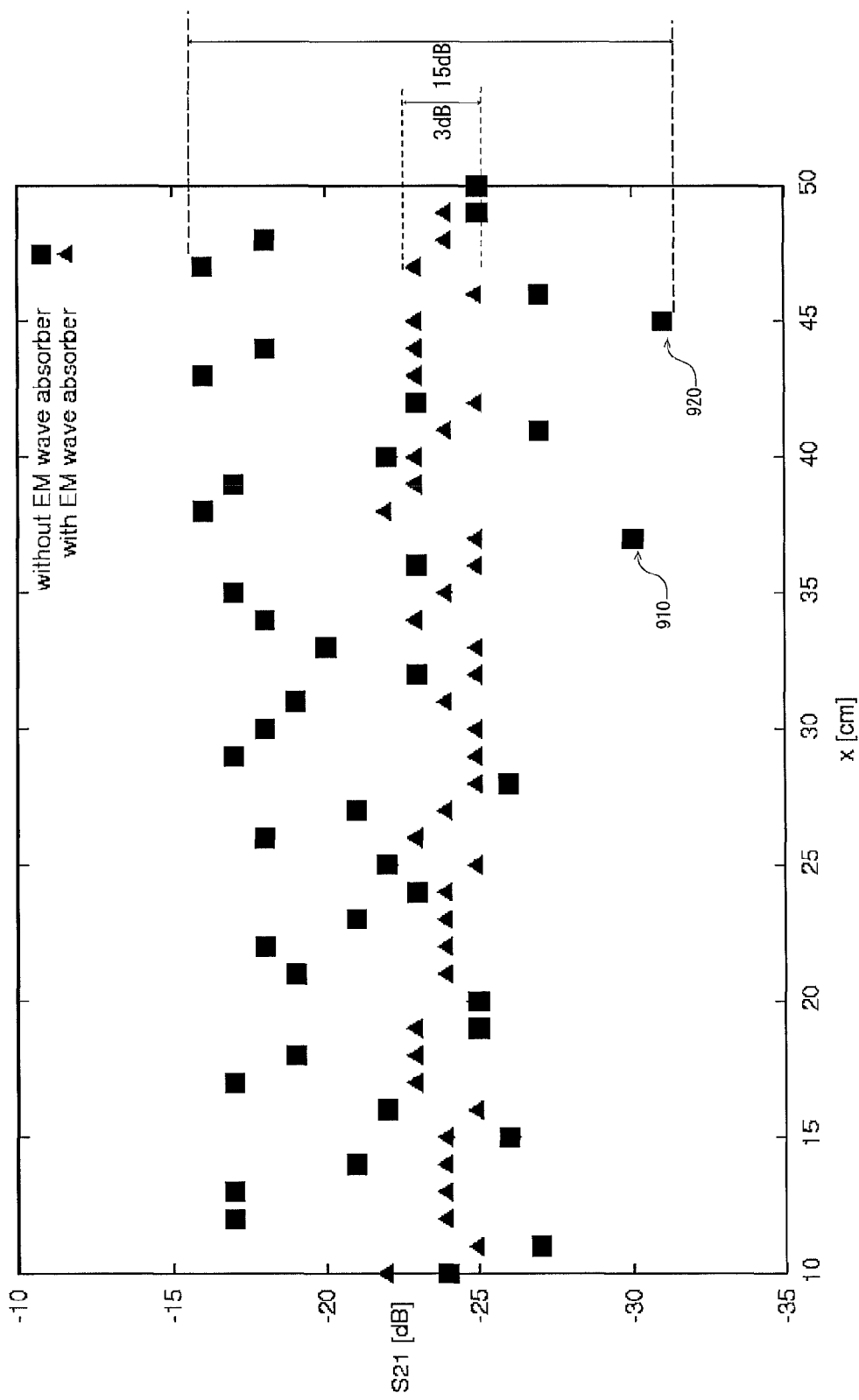

ELECTROMAGNETIC WAVE TRANSMISSION SHEET, RADIO LAN SYSTEM, RFID SYSTEM, AND ELECTROMAGNETIC WAVE TRANSMISSION METHOD

TECHNICAL FIELD

The present invention relates to an electromagnetic wave transmission sheet, a wireless LAN system, an RFID system, and an electromagnetic wave transmission method that are highly efficient.

BACKGROUND ART

Conventionally, a technique has been suggested for allowing an electromagnetic field to exist in an interspace area sandwiched between conductive sheets that face each other and for allowing the electromagnetic field to travel in a desired direction by changing the electromagnetic field by changing the voltage between the two conductive sheets or by changing the voltage between the conductive sheets by changing the electromagnetic field so as to transmit an electromagnetic wave. Non-patent document No. 1 shown in the following introduces an electromagnetic wave interface device that transmits/receives signals and receives electric power by electromagnetic wave transmission.

Also, a signal transmission system combined with a signal transmission device is known that transmits signals by changing an electromagnetic field in an interspace area sandwiched between a mesh-like conductor portion and a sheet-like conductor portion and in a transudation area on the outside of the mesh-like conductor portion.

In an electromagnetic wave transmission sheet used for the signal transmission system, the electromagnetic wave intensity in the transudation area is reduced according to the distance from the sheet. For example, the following non-patent document No. 1 discloses that arranging a resistor or an electromagnetic wave absorber at the end of the mesh-like conductor portion of the electromagnetic wave transmission sheet prevents the leakage or reflection of an electromagnetic wave.

[Patent document No. 1] JP 2007-281678

[Non-patent document No. 1] Hiroyuki Shinoda, et al., Method of Simultaneous Signal-Power Transmission Using Surface Microwave (Fundamental theories for ubiquitous and sensor networks, etc.), The Technical Report of The Proceeding of The Institute of Electronics, Information and communication Engineers, Vol. 107, No. 53(20070517) pp. 115-118

DISCLOSURE OF THE INVENTION

Problem to be Solved by the Invention

Providing an electromagnetic wave absorbing member at each end of an electromagnetic wave transmission sheet suppresses the reflection of an electromagnetic wave and reduces an unexpected standing wave. Thus, a stable electromagnetic wave can be obtained. However, an electromagnetic wave energy absorbed and disposed by the electromagnetic wave absorbing member grows, leaving room for improvement of efficiency.

In this background, a purpose of the present invention is to provide an electromagnetic wave transmission sheet or the like and electromagnetic wave transmission method that allow for highly-efficient transmission with low loss.

Means for Solving the Problem

An electromagnetic wave transmission sheet according to the present invention has a mesh-like electrode, and the length of the width thereof in a vertical direction that is perpendicular to the traveling direction of a transmitted electromagnetic wave is substantially equal to a length obtained by multiplying a half of the wavelength of the transmitted electromagnetic wave by a natural number so that a resonance state is obtained in the vertical direction.

The electromagnetic wave transmission sheet according to the present invention is preferably provided with an electromagnetic wave absorbing medium for reducing reflection of the transmitted electromagnetic wave in the traveling direction and does not need to be provided with an electromagnetic wave absorbing medium for reducing reflection in the direction perpendicular to the traveling direction of the transmitted electromagnetic wave.

The electromagnetic wave transmission sheet according to the present invention more preferably has a band-like shape and has long sides in the traveling direction of the transmitted electromagnetic wave and short sides in the width direction and may comprise an input interface configured to input the transmitted electromagnetic wave so that the transmitted electromagnetic wave is transmitted in the predetermined traveling direction.

The electromagnetic wave transmission sheet according to the present invention is more preferably provided with the electromagnetic wave absorbing medium configured to reduce reflection of the transmitted electromagnetic wave in the traveling direction on at least either one of the short sides and does not need to comprise the electromagnetic wave absorbing medium configured to reduce reflection of the transmitted electromagnetic wave in the vertical direction that is perpendicular to the traveling direction on the long sides.

The electromagnetic wave transmission sheet according to the present invention is more preferably provided with the input interface on the short side that is different from the short side on which the electromagnetic wave absorbing medium is provided.

More preferably, in the electromagnetic wave transmission sheet according to the present invention, the length of the width thereof in a vertical direction that is perpendicular to the traveling direction of the transmitted electromagnetic wave may be substantially equal to a half of the wavelength of the transmitted electromagnetic wave so that the transmitted electromagnetic wave is a plane wave.

A wireless LAN system according to the present invention comprises: the electromagnetic wave transmission sheet according to any one of the above described paragraphs is configured to transmit a communication radio wave having the input interface connected to a wireless LAN access point; and a wireless LAN adapter configured to transmit and receive the communication radio wave with the electromagnetic wave transmission sheet.

An RFID system according to the present invention comprises: the electromagnetic wave transmission sheet according to any one of the above described paragraphs configured to transmit a communication radio wave having the input interface connected to an RFID reader/writer; and an RFID tag configured to transmit and receive the communication radio wave with the electromagnetic wave transmission sheet.

An electromagnetic wave transmission method according to the present invention of an electromagnetic wave transmission sheet provided with: a first conductor layer having a mesh-like conductor; a second conductor layer arranged substantially parallel to the first conductor layer; and a dielectric layer provided in between the first conductor layer and the second conductor layer, comprises: reflecting and trapping an electromagnetic wave in a width having a length obtained by multiplying a half of the wavelength of a transmitted electromagnetic wave by a whole number so that a resonance state is obtained in a direction that is perpendicular to the transmission direction of the electromagnetic wave; and allowing an electromagnetic wave absorbing member to absorb the electromagnetic wave so as to reduce the reflection in the transmission direction of the electromagnetic wave.

Advantageous Effects

According to the present invention, an electromagnetic wave transmission sheet or the like and electromagnetic wave transmission method can be provided that allow for highly-efficient transmission with low loss.

BRIEF DESCRIPTION OF THE DRAWINGS

FIG. 6 is a diagram explaining properties of the communication sheet;

FIG. 7 is a diagram illustrating the specifications of the electromagnetic wave absorbing member used in the measurement system;

FIG. 9 is a diagram illustrating measurement results of the measurement system of a supporting experiment 1.

EXPLANATION OF REFERENCE NUMERALS

Figure 1:
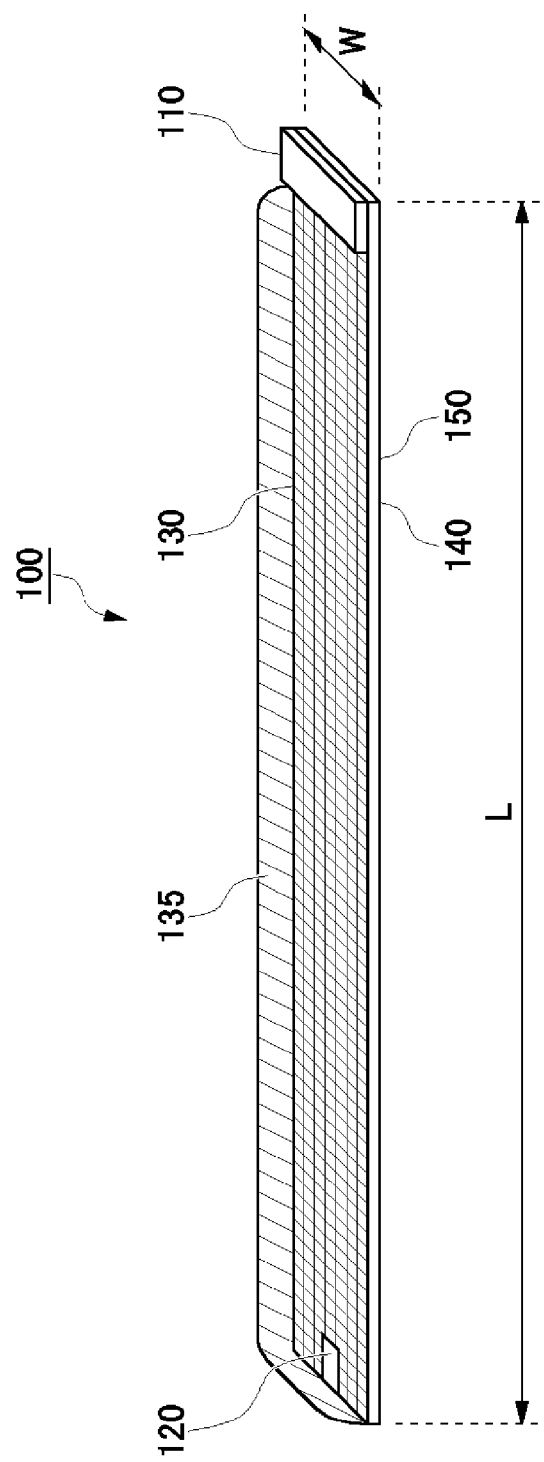
FIG. 1 is a diagram conceptually illustrating the configuration of an electromagnetic wave transmission sheet according to a first embodiment.

100 communication sheet
110 electromagnetic wave absorbing member
120 electromagnetic wave interface
130 mesh-like conductor layer
140 plate-like conductor layer
150 dielectric layer

BEST MODE FOR CARRYING OUT THE INVENTION

Embodiments of the present invention are described in detail in the following. These embodiments described in the following are intended to be exemplary but not limiting and are not intended to limit the scope of the invention.

To facilitate explanation and understanding, a conductor in an electromagnetic-wave frequency band used for transmitting an electromagnetic wave is referred to as a "conductor," and a dielectric in the frequency band is referred to as a "dielectric" in the following descriptions. Therefore, a material is not directly limited by, for example, whether it acts as a conductor, a semiconductor, or an insulator with respect to a direct current. A conductor and a dielectric are defined by the properties thereof with respect to an electromagnetic wave, and the form (e.g., a solid, a liquid, or a gas) and constitutional materials thereof are not limited.

Regarding the general description of the electromagnetic wave transmission sheet exemplified in the embodiment, it is a band-like communication sheet whose length of the width is about half of the wavelength of an electromagnetic wave. The band-like communication sheet is not provided, on the two long sides that are perpendicular to the width direction, with an electromagnetic wave absorbing member that absorbs an electromagnetic wave and reduces the reflection. Rather, an electromagnetic wave is reflected at each long side in a positive manner.

Reflecting an electromagnetic wave at each of the long sides of the electromagnetic wave transmission sheet causes a resonance state in the width direction, suppressing the generation of a standing wave. A clip-like electromagnetic wave interface, which is used as a feeding point of an electromagnetic wave, is provided on a short side of the electromagnetic wave transmission sheet, and an electromagnetic wave absorbing member is provided on the other short side.

The electromagnetic wave absorbing member provided on the other short side absorbs an electromagnetic wave and reduces a reflected electromagnetic wave. This reduces the reflection of an electromagnetic wave in the direction of the long side, and the generation of an unexpected standing wave is thus prevented.

Therefore, the electromagnetic wave transmission sheet allows for highly-efficient transmission of an electromagnetic wave with low loss since an electromagnetic wave is resonated in the width direction without absorbing or disposing the electromagnetic wave. Thus, the intensity of an electromagnetic wave transuded from the mesh-like conductor layer increases as a whole. Contrarily, the input energy from the electromagnetic wave interface can be reduced when the intensity of an electromagnetic wave transuding from the mesh-like conductor layer is to be at the conventional level.

Since an unexpected standing wave can be reduced, the unevenness in the intensity of an electromagnetic wave generated due to a standing wave can be overcome. Thus, a stable intensity can be ensured for a transuded electromagnetic wave without depending on the location on the electromagnetic wave transmission sheet. Further, since an electromagnetic wave absorbing member is not need to be provided on the two long sides of the band-like electromagnetic wave transmission sheet, an electromagnetic wave transmission sheet, which is compact and lightweight, can be realized. Thus, a low-cost electromagnetic wave transmission sheet can be achieved.

The electromagnetic wave transmission sheet according to the embodiment can be used, for example, as a radio wave transmission medium, which also serves as an antenna, for a wireless LAN since the intensity of an electromagnetic wave transuding from the mesh-like conductor layer increases. Thus, it allows for establishing a PC or the like, which is provided with a wireless LAN adapter mounted on or arranged close to the electromagnetic wave transmission sheet, and a wireless LAN system.

The electromagnetic wave transmission sheet according to the embodiment can be used, for example, as a radio wave transmission medium, which also serves as an antenna, for an RFID since the intensity of an electromagnetic wave transuding from the mesh-like conductor layer increases. Thus, it allows for communication with an ID tag that is mounted on or arranged close to the electromagnetic wave transmission sheet.

An electromagnetic wave transuding from the electromagnetic wave transmission sheet does not scatter and is limited to a given area. Thus, it is preferred from a security perspective, and stable communication is also possible since an electromagnetic wave having enough intensity that is steady and stable can be obtained on the electromagnetic wave transmission sheet.

In the following paragraphs, a detailed description is given based on figures.

First Embodiment

FIG. 1 is a diagram conceptually illustrating the configuration of an electromagnetic wave transmission sheet (hereinafter, accordingly referred to as a communication sheet) according to a first embodiment. A communication sheet 100 has a configuration where a thin plate-like dielectric layer 150 is sandwiched between a mesh-like conductor layer 130 and a plate-like conductor layer 140. The mesh pitch of the mesh-like conductor layer 130 and the thickness of the dielectric layer 150 are set to be smaller than the wavelength of an electromagnetic wave transmitted through the communication sheet 100.

The mesh-like conductor layer 130 is typically configured to have a mesh-like structure having a mesh pitch of 7 mm and a square opening portion measuring 6 mm on each side. With this shape, an electromagnetic field exudes from the mesh-like conductor layer 130 to a certain height. The area in which electromagnetic field exudes is referred to as a transudation area 135.

The height of the transudation area is determined by the pattern shape of the mesh and by the thickness and the dielectric constant of the dielectric layer 150 of the communication sheet 100. In the mesh-like conductor layer 130 having a square mesh structure where the line interval and the line width of the mesh are Im and Wm, respectively, the mesh pitch is defined to be (Wm+Im).

In the communication sheet 100, it is assumed that the mesh pitch of the mesh-like conductor layer 130 is much smaller than the wavelength of an electromagnetic wave to be transmitted and is typically at most 0.2 times that of the electromagnetic wave to be transmitted.

It is assumed that the thickness of the dielectric layer 150 is much smaller than the wavelength of an electromagnetic wave and is typically at most 0.04 times that of the electromagnetic wave. As described above, when the mesh pitch of the mesh-like conductor layer 130 and the thickness of the dielectric layer 150 are much smaller than the wavelength of an electromagnetic wave transmitted through the communication sheet 100, the communication sheet 100 has a cutoff frequency just like a so-called waveguide.

In this case, the following expression

Expression 1

$$f_c = \frac{c}{\sqrt{\varepsilon_r}} \sqrt{\left(\frac{m}{2W}\right)^2 + \left(\frac{n}{2d}\right)^2 + \left(\frac{l}{2L}\right)^2}$$ EXPRESSION (1)

gives the cutoff frequency.

where c represents the speed of light in a vacuum, $\varepsilon_r$ represents a relative permittivity of the dielectric layer 150 of the communication sheet 100, W represents the width of the sheet, L represents the length of the communication sheet 100, and d represents the thickness of the dielectric layer 150. The symbols m and n are whole numbers. An electromagnetic wave having a frequency that is smaller than the cutoff frequency fc cannot be substantially transmitted in the communication sheet in an efficient manner. In the band-like communication sheet 100 having a length L and a width W, the width W of the sheet when resonance is produced using n=l=0 in the expression (1) is expressed as follows:

Expression 2

$$W = \frac{c}{2\sqrt{\varepsilon_r} f}$$ EXPRESSION (2)

In other words, when the length of the width W of the communication sheet 100 is set to be the integral multiple of the width W shown in the expression (2), resonance is produced. In the expression (2), it is shown that the width W is a half wavelength. Thus, resonance is produced when the width W is the integral multiple of the half wavelength. The symbol f in the expression (2) represents the frequency of the transmitted electromagnetic wave.

When the width W is the integral multiple of the half wavelength, the electromagnetic wave transmitted in the communication sheet 100 is in a resonance state. Thus, the electric power electromagnetically emitted from the mesh-like conductor layer 130 of the communication sheet 100 increases relatively.

When the frequency of the electromagnetic wave transmitted in the communication sheet 100 and the width W of the communication sheet 100 satisfy the relationship shown in the expression (2), the electromagnetic wave in the communication sheet 100 proceeds in the long-side direction of the band-like communication sheet 100. In other words, when the length of the width W of the communication sheet 100 is equal to the length of the half wavelength of the electromagnetic wave transmitted in the communication sheet 100, the electromagnetic wave appears to be proceeding in the long-side direction of the communication sheet 100 as a so-called plane wave.

Therefore, the electromagnetic wave absorbing member 110 (also referred to as a terminal member) provided on either of the short sides of the communication sheet 100 is sufficient. An electromagnetic wave interface 120 for inputting electric power is provided on the other short side of the communication sheet 100. Thus, the electromagnetic wave absorbing member 110 needs to be provided on the short side that is opposite to the short side on which the feeding point is provided.

The electromagnetic wave absorbing member 110 can be configured by combining a conductor plate and a resistor; for example, a conductor plate may be merely mounted on the mesh-like conductor layer 130. The electromagnetic wave absorbing member 110 may be configured by embedding a material that absorbs an electromagnetic wave after cutting out the communication sheet 100 and by coating the top and the bottom thereof with conductor plates. The configuration of the electromagnetic wave absorbing member 110 is not limited to that shown in FIG. 1.

An example is shown where the electromagnetic wave interface 120 and the electromagnetic wave absorbing member 110 are provided at the respective edges of the short sides in the communication sheet 100. However, the electromagnetic wave interface 120 and the electromagnetic wave absorbing member 110 are not limitedly provided at these positions and can be provided at arbitrary positions. The electromagnetic wave absorbing member 110 preferably covers the length of the short side (i.e., the width W) so that the electromagnetic wave absorbing member 110 can absorb an electromagnetic wave throughout the entire width. However, when, for example, there is any structural restriction, the length of the electromagnetic wave absorbing member 110 may be shorter than the length of the short side.

Since an electromagnetic wave is transmitted as a plane wave in the communication sheet 100, there is no such problems as a decrease, which is inversely proportional to a distance from the electromagnetic wave interface 120 through which the electromagnetic wave is input, in the electric power of the transmitted electromagnetic wave. Therefore, it is possible to minimize the attenuation of the transmitted electromagnetic wave. The intensity of the electromagnetic wave that can be received by a reception interface device (not shown) can be relatively increased, thus allowing for stable communication.

It is assumed in the communication sheet 100 that the reception interface (not shown) is arranged on the communication sheet 100 and in between the electromagnetic wave interface 120 and the electromagnetic wave absorbing member 110.

Since the intensity of the electromagnetic wave that can be received by the reception interface device (not shown) can be relatively increased, the reception interface device that is used does not need to be the one exclusively for a communication sheet. For example, using an existing reception antenna or the like of a wireless LAN adapter, an RFID tag, etc., as the reception interface device also allows for the reception of an electromagnetic wave having enough intensity for stable communication.

In other words, an antenna that is already built in a mobile device, etc., can be directly used. Thus, a highly user-friendly application can be provided at a low cost. It is also possible to provide an electromagnetic wave transmission system with even higher performance by using a reception interface device exclusively for a communication sheet.

No specific restriction is applied to the length of a side of a conventional communication sheet. Typically, the length of a side thereof is at least about several times more than the wavelength of an electromagnetic wave in a communication sheet, and the shape thereof is a one meter-square quadrangle. Since a terminal member to be provided at the edge of the communication sheet needs to be very long, the material cost tends to be high.

Also, since an emitted electromagnetic wave is relatively weak in a conventional communication sheet, the electric power of the electromagnetic wave received at an electromagnetic wave interface device is also weak. Thus, a conventional communication sheet is often subjected to restrictions depending on an application.

Such a problem arises due to that fact that, when an electromagnetic wave is transmitted in a communication sheet, a standing wave is generated due to the reflection of the electromagnetic wave at the edge of the communication sheet such that there exists some parts where the intensity of an electrical field becomes weak. When the intensity of the electrical field becomes weak, an electromagnetic wave having sufficient intensity for communication cannot be received even when an interface device is provided.

In this background, it has been suggested to provide a terminal member for absorbing an electromagnetic wave at all the edges of a communication sheet so as to prevent the generation of a standing wave. This is because it is preferred to provide a terminal member at all the four edges in order to effectively reduce a standing wave.

To provide a terminal member at all the four sides, a terminal member is required that has a length equal to about the total length of all the sides of a communication sheet. The larger the total length of the sides of the communication sheet becomes, the larger the length of the terminal member becomes. Therefore, a problem arises where the material cost becomes higher. Further, the entire communication sheet becomes even larger and heavier due to the terminal member.

The electric power of an electromagnetic wave transmitted in the communication sheet terminated on all four sides decreases in inverse proportion to a distance on the communication sheet from the electromagnetic wave interface device (also referred to as a transmission interface device or an input interface device) for inputting the electromagnetic wave. The reason for the decrease in the electric power of the electromagnetic wave, which is inversely proportional to the distance, is due to the fact that the electromagnetic wave is transmitted as a cylindrical wave in the communication sheet. Thus, there is a tendency where received power in the case of performing communication between electromagnetic interfaces becomes small when a distance between the electromagnetic wave interface devices is large. The communication sheet 100 overcomes such a problem as the one described above.

Second Embodiment

Figure 2:
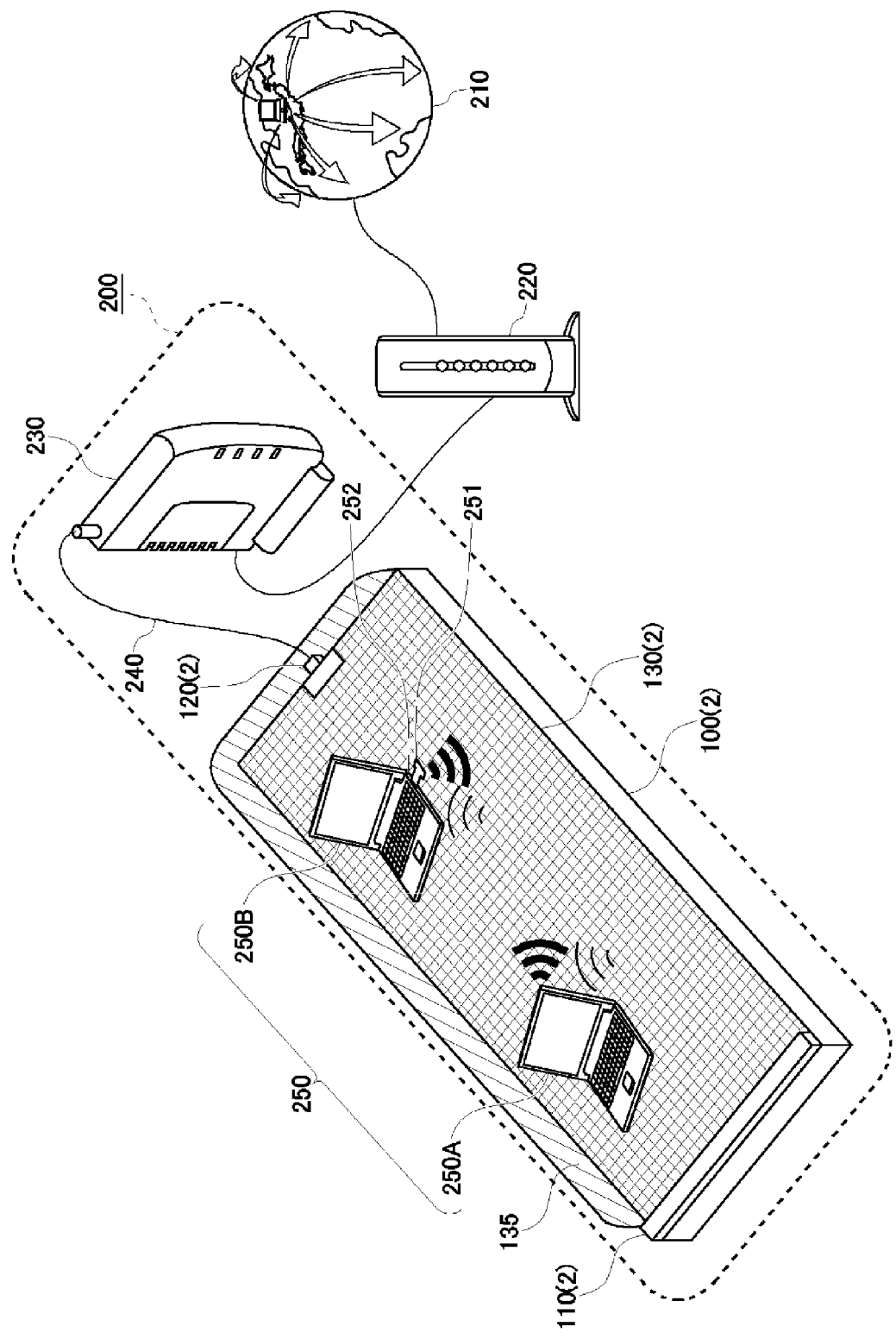
FIG. 2 is a diagram explaining the overview of the configuration of a wireless LAN system that uses a communication sheet.

The embodiment suggests applying the above-stated band-like communication sheet 100 to a wireless LAN system. FIG. 2 is a diagram explaining the overview of the configuration of a wireless LAN system 200 that uses a communication sheet 100(2). The communication sheet 100(2) has the same configuration and operation as those of the communication sheet 100; thus, descriptions thereof will be omitted in order to avoid any duplication of explanations.

The wireless LAN system 200 is connected to internet 210 via a modem 220. In the wireless LAN system 200, the communication sheet 100(2) is connected to an access point 230, which serves as a wireless LAN access point, via a coaxial cable 240. In other words, the access point 230 inputs an electromagnetic wave related to communication into the communication sheet 100(2) via the coaxial cable 240 and the electromagnetic wave interface 120(2) instead of radiating a radio wave related to communication into the air.

An information processing terminal 250 is mounted at an arbitrary position on a mesh-like conductor layer 130(2) of the communication sheet 100(2). The information processing terminal 250 is typically a so-called personal computer. However, the information processing terminal 250 may be a device having other communication functions such as an information appliance. An information processing terminal 250A has a communication function corresponding to the function of a wireless LAN adapter therein, and an information processing terminal 250B is provided with a wireless LAN function by inserting a wireless LAN card 251 into a card bus 252.

Being mounted on the communication sheet 100(2), the information processing terminal 250 can efficiently receive an electromagnetic wave emitted from the communication sheet 100(2). Also, being provided with an electromagnetic wave absorbing member 110(2), the communication sheet 100(2) has less unexpected standing wave in the long-side direction, thus allowing for relatively stable communication without depending on the position on which the information processing terminal 250 is mounted.

On the other hand, since the communication sheet 100(2) is in a resonance state in the short-side direction, an electromagnetic wave transuding from the mesh-like conductor layer 130(2) is relatively large and can be obtained in a stable manner.

In a conventional wireless LAN system that uses an antenna, there are some spots where an electromagnetic wave transmitted from the antenna into the air cannot reach due to an obstacle such as a wall, a person, or a partition. Thus, there are occasions when the communication is unstable. Also, there is concern that an electromagnetic wave flying even to an unintended place such as an adjoining room or another floor leads to a security issue.

The wireless LAN system 200 that uses the communication sheet 100(2) can overcome such a problem as the one described above and remove the above concern. As shown in FIG. 2, the access point 230 of a wireless LAN is connected to the electromagnetic wave interface 120(2) via the coaxial cable 240 in the wireless LAN system 200.

The band-like communication sheet 100(2) is placed where a wireless LAN is used (e.g., on a desk in the office or conference room). Placing on or close to the band-like communication sheet 100(2) a mobile device [the information processing terminal 250 such as a laptop computer or a PDA (Personal Digital Assistant)] provided with a wireless LAN communication function, for example, IEEE 802.11 a/b/g allows for communication between the access point 230 of the wireless LAN and the mobile device.

Therefore, configuring and placing the wireless LAN system at a position where the wireless LAN communication is desired allows for stable communication. Since this provides an advantage of clarifying an area that allows for communication, the concern regarding a security issue can be reduced.

If the communication sheet 100(2) is assumed to be an antenna, it is possible that the communication sheet 100(2) is considered to be a traveling-wave antenna and thus considered to be a low-gain antenna. Therefore, there is less concern that, for example, communication is illegally interfered due to a communication radio wave flying to an adjoining room or a nearby building.

In the wireless LAN system 200, an electromagnetic wave emission area for the communication in the air is limited to a certain range above the mesh-like conductor layer 130(2) and can be made to be extremely small. Within the range of the electromagnetic wave emission area for the communication in the air, an electromagnetic wave, which is relatively stable as described above and also strong, can be obtained. Therefore, highly secured and highly reliable wireless LAN communication is possible. Since a radio wave having sufficient intensity can be obtained, it is not necessary for the information processing terminal 250 to be newly provided with a special powered device or power receiving mechanism, and a conventional wireless LAN adapter meets the needs.

In another respect, it can be said that the wireless LAN system 200 has advantages of both conventional wired LAN that uses a LAN cable and conventional wireless LAN that depends only on the emission of a radio wave and has even superior advantages.

Third Embodiment

Figure 3:
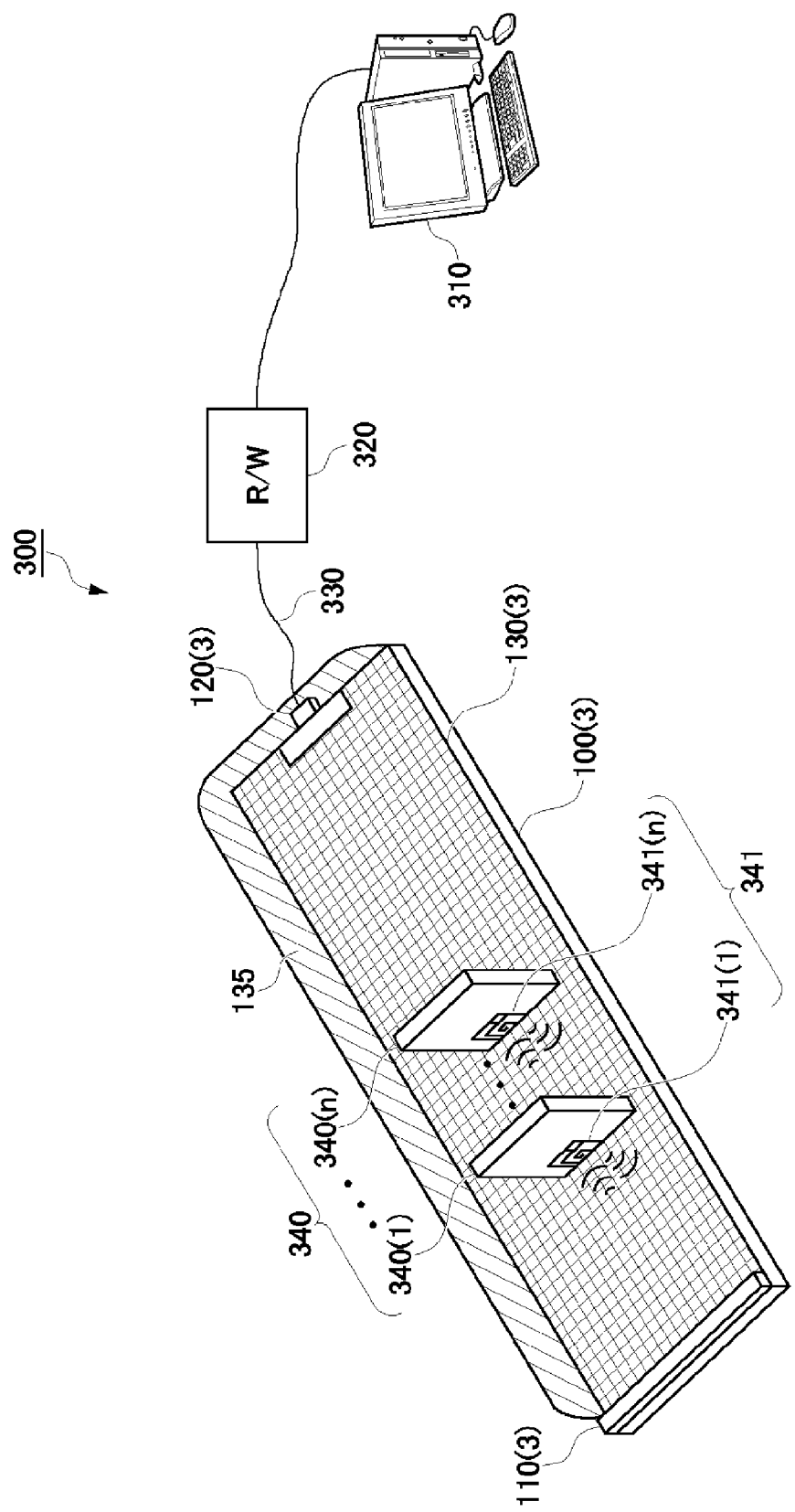
FIG. 3 is a conceptual diagram explaining the overview of the configuration of an RFID system that uses a communication sheet.

The embodiment suggests applying the above-stated band-like communication sheet 100 to an RFID system. FIG. 3 is a conceptual diagram explaining the overview of the configuration of an RFID system 300 that uses a communication sheet 100(3). The communication sheet 100(3) has the same configuration and operation as those of the communication sheet 100; thus, descriptions thereof will be omitted in order to avoid any duplication of explanations.

In FIG. 3, an RFID reader/writer 320 is connected to a management device 310 of the upper node. The communication sheet 100(3) is connected to the RFID reader/writer 320 via a coaxial cable 330 and an electromagnetic wave interface 120(3). The RFID reader/writer 320 may have either a reading function or a writing function.

A book 340 to which an RFID tag 341 is attached is placed on the communication sheet 100(3). The book 340 represents n books 340(1) through 340(n) and RFID tags 341(1) through 341(n) are separately attached to the book 340 in relation with books 340(1) through 340(n).

The RFID reader/writer 320 inputs, when communicating an ID control signal or the like, with the RFID tag 341, a communication electromagnetic wave for the ID control signal or the like, into the communication sheet 100(3) via the coaxial cable 330 and the electromagnetic wave interface 120(3) instead of radiating a radio wave directly into the air from an antenna.

The RFID tag 341 receives an electromagnetic wave for the ID control signal or the like emitted from the mesh-like conductor layer 130(2) of the communication sheet 100(3) and transmits the electromagnetic wave to the mesh-like conductor layer 130(2) of the communication sheet 100(3).

Being placed on the communication sheet 100(3), the RFID tag 341 can efficiently receive an electromagnetic wave emitted from the communication sheet 100(3). Also, being provided with an electromagnetic wave absorbing member 110(3), the communication sheet 100(3) has less unexpected standing wave in the long side direction, thus allowing for relatively stable communication and detection without depending on the position on which the RFID tag 341 is placed.

In offices, etc., there is a high demand for management of the presence and transfer of articles, documents, books, etc., in a shelf. A method that uses an RFID is known as a method for the management.

Conventionally, the RFID tag 341 is attached to an article to be managed, and an antenna is then provided inside a shelf. The antenna and an RFID reader are then connected by a coaxial cable so as to detect the presence of the RFID tag 341. In a conventional method, it is necessary to design separately in detail, for example, the position or the direction of an antenna, according to the material, the properties (e.g., metal or non-metal, etc.), the size, and the shape of a shelf. Thus, a shelf customized for an RFID is required. Therefore, there arises a disadvantage where the user has to purchase a shelf customized for an RFID in addition to the shelf the user possesses.

On the other hand, the RFID reader/writer 320 is connected to the electromagnetic wave interface 120(3) via a coaxial cable in the RFID system 300 that uses the communication sheet 100(3). Then, the RFID tag 341 is attached to an article (e.g., the book 340 shown in FIG. 3) to be managed.

For example, by placing on or putting close to the communication sheet 100(3) the article such that the side on which the RFID tag 341 is attached faces the communication sheet 100(3), whether the article is present can be read.

In the RFID system 300, the distance between the communication sheet 100(3) and the RFID tag 341 can be made almost constant at all the time. Therefore, it is not necessary to separately design (e.g., design for the interference or the intensity of an electromagnetic wave, etc.) depending on the type of the shelf. Simply placing the RFID system 300 on an existing shelf allows the RFID system 300 to be easily configured.

In the case of a conventional RFID system that uses an antenna, there is concern that an unexpected electromagnetic wave from an RFID reader flies to an unintended place such that an RFID tag that is not intended to be read is detected. However, if the communication sheet 100(3) is assumed to be an antenna in the RFID system 300, the communication sheet 100(3) will function just like a low-gain antenna. Thus, the possibility of the above-stated problem to be caused will be reduced.

On the other hand, the RFID system 300 that uses the communication sheet 100(3) may be used while being placed on a desk or a floor as well as a shelf, for example, being attached to a wall.

Therefore, configuring and placing the RFID system 300 at a position where an article to be managed is located allows for stable communication and detection. Since this provides an advantage of clarifying an area that allows for communication and detection, the concern that the reading range is not clear can be reduced.

In the RFID system 300, an electromagnetic wave emission area for the communication and the detection in the air is limited to a certain range above the mesh-like conductor layer 130(3) and can be made to be extremely small. Within the range of the electromagnetic wave emission area for the communication and the detection in the air, an electromagnetic wave, which is relatively stable as described above and also strong, can be obtained. Therefore, highly secured and highly reliable communication and detection are possible. Since a radio wave having sufficient intensity can be obtained, it is not necessary for the RFID tag 341 to be newly provided with a special powered device or power receiving mechanism, and a conventional RFID tag function meets the needs.

Fourth Embodiment

Figure 4:
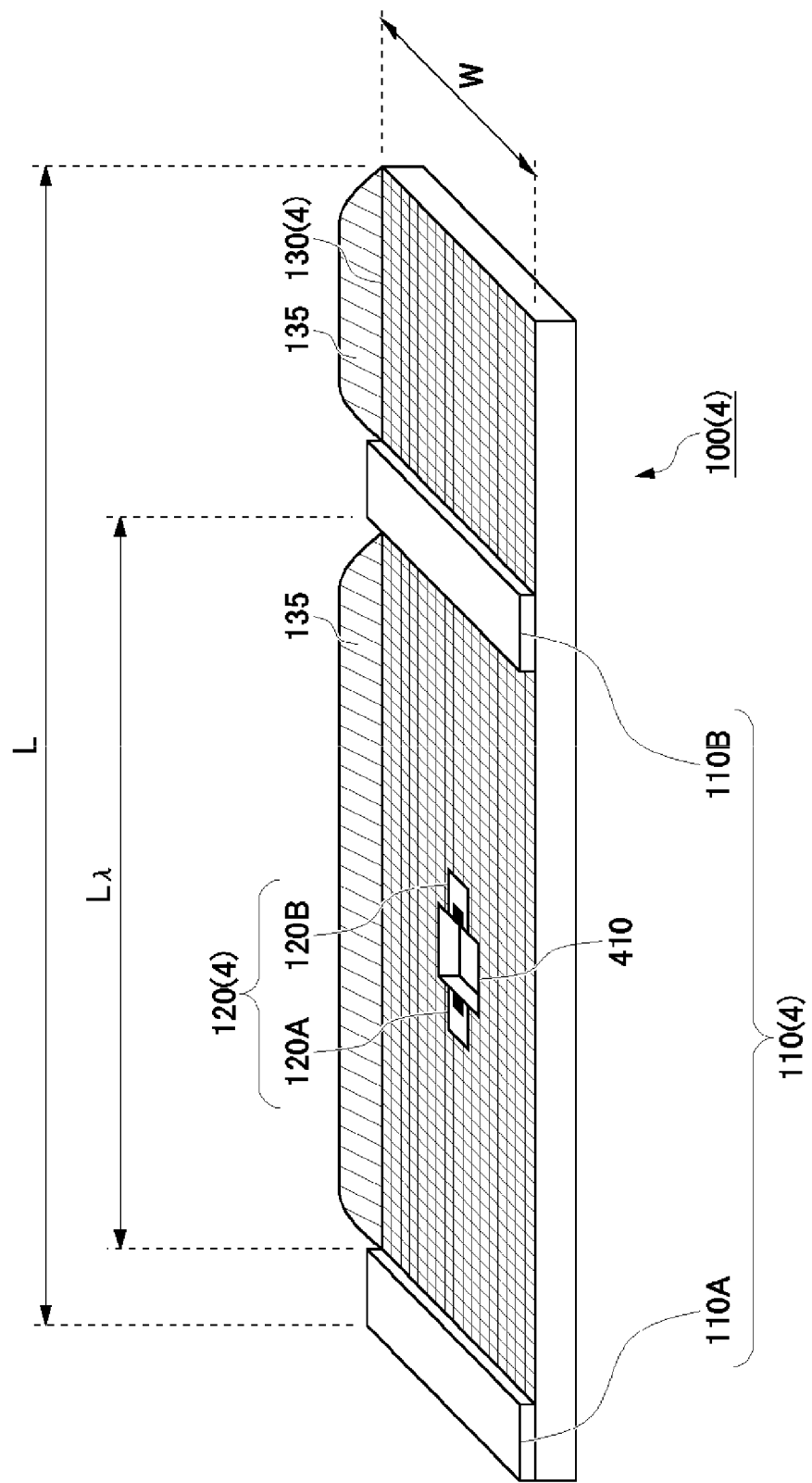
FIG. 4 is a conceptual diagram of the configuration explaining a communication sheet according to a fourth embodiment.

FIG. 4 is a conceptual diagram of the configuration explaining a communication sheet 100(4) according to a fourth embodiment. The communication sheet 100(4) has the same configuration as that of the communication sheet 100 except that the communication sheet 100(4) is provided with: two clip-type electromagnetic wave interfaces 120A and 120B (hereinafter, referred to as an electromagnetic wave interface 120(4)) such that the back sides are opposite to each other with respect to a through hole 410; and two electromagnetic wave absorbing members 110A and 110B (hereinafter, referred to as an electromagnetic wave absorbing member 110(4)).

The communication sheet 100(4) efficiently transmits an electromagnetic wave and the electromagnetic wave leaks from a mesh-like conductor layer 130(4) in an interval of a length Lλ that is sandwiched between the two electromagnetic wave absorbing members 110A and 110B.

The communication sheet 100(4) achieves the same operations and effects as those achieved by the communication sheet 10 in the interval of the length Lλ that is sandwiched between the two electromagnetic wave absorbing members 110A and 110B. However, the communication sheet 100(4) is even more preferable in that the interval of Lλ can be appropriately set by providing the communication sheet 100(4) at an arbitrary position and in that the electromagnetic wave interface 120(4) having multiple electromagnetic wave interfaces allows a larger electromagnetic wave to be input.

The communication sheet 100(4) is preferable since communication sheet 100(4) can be used even when the length L of the communication sheet 100(4) or the interval of the length L becomes larger, for example, in an occasion where the use by a large group of people in a large conference room, auditorium, or the like is expected.

(Supporting Experiment)

Figure 5A:
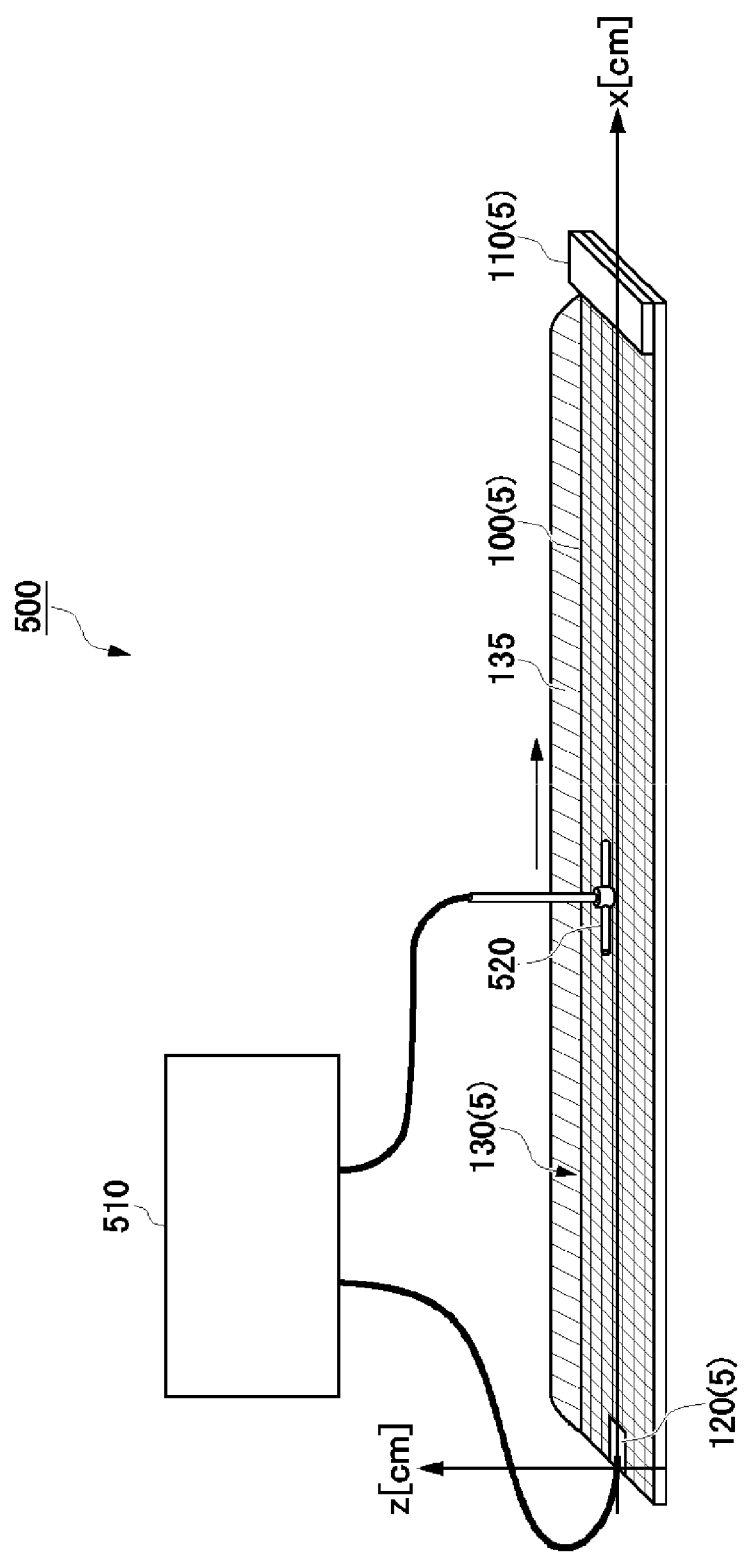
FIG. 5a is a conceptual diagram explaining the configuration of a measurement system for a supporting experiment.
Figure 5B:
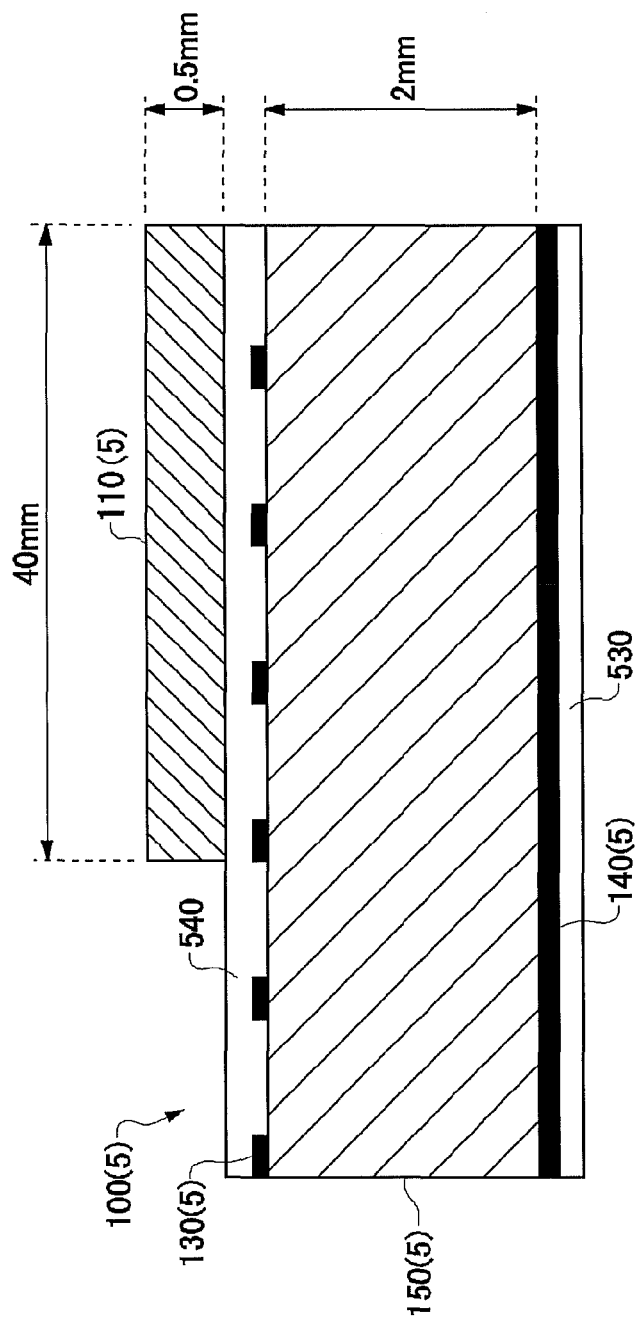
FIG. 5b is a diagram explaining the cross-section of a short side of the communication sheet on which an electromagnetic wave absorbing member is mounted.

In order to evaluate the above-stated effects, a band-like communication sheet 100(5) for a 2.45-GHz band was prepared, and the transmission coefficient (S21) of an electromagnetic wave was measured. The configuration of a measurement system 500 is shown in FIG. 5. FIG. 5 is a conceptual diagram explaining the configuration of the measurement system 500 for a supporting experiment. FIG. 5a illustrates the entire configuration of the measurement system 500. FIG. 5b is a diagram explaining the cross-section of a short side of the communication sheet 100(5) on which an electromagnetic wave absorbing member 110(5) is mounted.

As shown in FIG. 5b, the communication sheet 100(5) has a configuration where a dielectric layer 150(5) is sandwiched between a mesh-like conductor layer 130(5) and a plate-like conductor layer 140(5) as in the communication sheet 100. On the outside of the mesh-like conductor layer 130(5) and the plate-like conductor layer 140(5), protection layers 530 and 540 are provided, respectively, that are made of a resin or the like having respective predetermined dielectric constants. In the measurement system 500, the length and the thickness of the electromagnetic wave absorbing member 110(5) were set to be 40 millimeters and 0.5 millimeters, respectively. The thickness of the dielectric layer 150(5) was set to be 2 millimeters.

The measurement system 500 is connected so that an electromagnetic wave input from the electromagnetic wave interface 120(5) of the communication sheet 100(5) can be received by a reception antenna 520 and so that the transmission coefficient (S21) can be measured by a network analyzer 510 while changing the position of the reception antenna 520.

The communication sheet 100(5) used in the measurement system 500 has the same configuration as that of the communication sheet 100, and the configuration thereof is shown in FIG. 6. FIG. 6 is a view explaining the properties of the communication sheet 100(5).

In the communication sheet 100(5), the wavelength of an electromagnetic wave of 2.45 GHz is about ten centimeters. Therefore, the width of the communication sheet 100(5) is set to be five centimeters, which is the half of the wavelength.

The electromagnetic wave interface 120(5) is provided on a short side of the communication sheet 100(5), and the electromagnetic wave absorbing member 110(5) is mounted on the other short side. The specifications of the used electromagnetic wave absorbing member 110(5) are shown in FIG. 7. FIG. 7 is a diagram illustrating the specifications of the electromagnetic wave absorbing member 110(5) used in the measurement system 500.

The shape of the electromagnetic wave interface 120(5) provided on one of the short sides is shown in FIG. 8. FIG. 8 is a diagram schematically illustrating the typical shape of the electromagnetic wave interface 120(5) used in the measurement system 500.

Figure 8A:
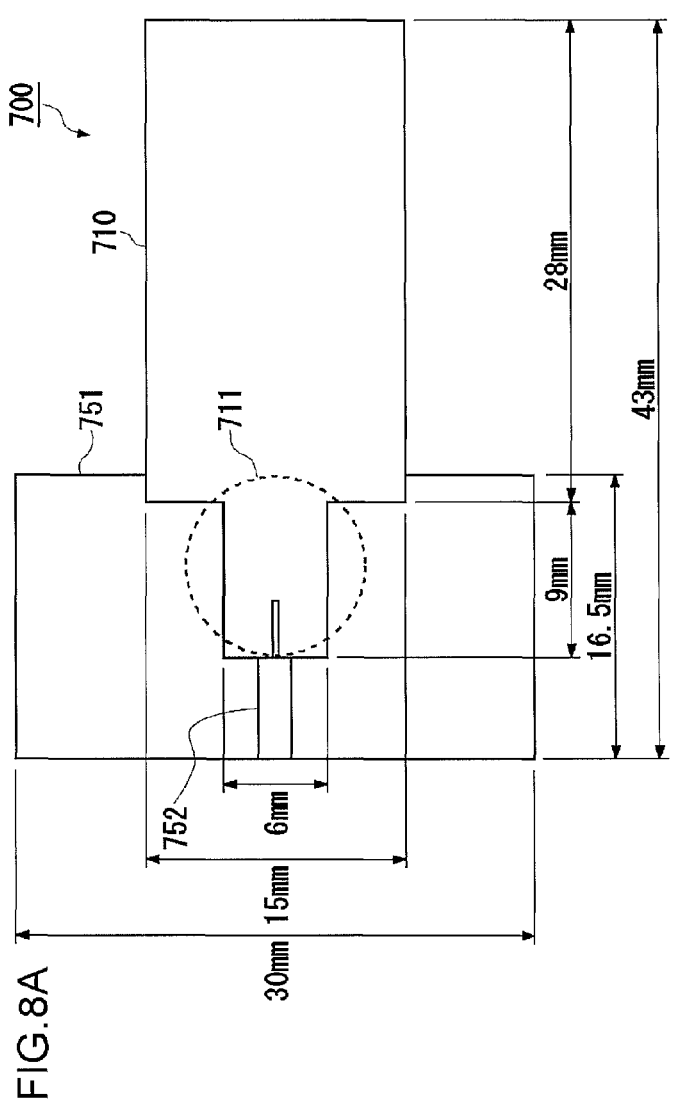
FIGS. 8a and 8b are diagrams schematically illustrating the shape of an electromagnetic wave interface used in the measurement system.
Figure 8B:
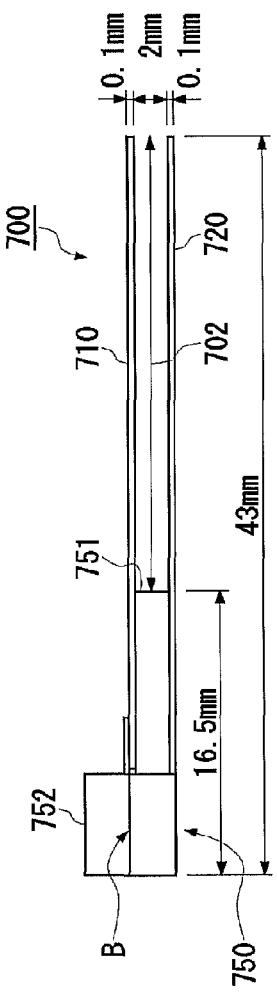

A description is now given of the electromagnetic wave interface shown in FIG. 8. As a typical example of the electromagnetic wave interface 120(5) of the measurement system 500, an electromagnetic wave interface device 700 is explained as follows in FIG. 8. FIGS. 8A and 8B are a front view and a bottom view of the electromagnetic wave interface device 700, respectively.

The electromagnetic wave interface device 700 used in the experiment in the 2.4-GHz band is configured by using an MMCX connector. In FIG. 8, an MMCX connector 752 forms a locking portion 750 that keeps a first electrode portion 710 and a second electrode portion 720 together along with a dielectric 751 having a relative permittivity of 4.6.

The electromagnetic wave interface device 700 may have a resonant portion 711 typically having the width of six millimeters at a certain part of the first electrode portion 710 where the first electrode portion 710 and the MMCX connector 752 are connected. The electromagnetic wave interface device 700 allows for reduction in the reflection so that highly-efficient transmission and reception of an electromagnetic wave can be achieved with low loss in a specific electromagnetic wave frequency of about 5.15-5.35 GHz, which is not used in the experiment, by setting the resonant portion 711 to have a width of, for example, five to seven millimeters.

In the electromagnetic wave interface device 700, the first electrode portion 710 has an inverse relationship where a preferred electromagnetic wave frequency is roughly doubled when the length of the width of the resonant portion 711 is reduced by about half in the direction of the tangent to the part at which the communication sheet is fit. Therefore, the width of the resonant portion 711, in other words, typically the length of the width of the resonant portion 711 at the feeding point in a direction perpendicular to the fitting direction of the first electrode portion 710 and the communication sheet, may be determined by using the following relational expression (3) in relation to a specific electromagnetic wave frequency used for the transmission and the reception.

Expression 3

(WAVELENGTH IN VACUUM (mm)/√(RELATIVE PERMITTIVITY OF LOCKING PORTION))÷ (WIDTH LENGTH AT FEEDING POINT (mm))= (CONSTANT VALUE)    EXPRESSION (3)

The "constant value" in the expression (3) is typically about five based on the above-stated relationship.

The length of the resonant portion 711 in the lateral direction (the length from the feeding point in the fitting direction) in FIG. 8A is nine millimeters. The electromagnetic wave interface device 700 is illustrated as an example of the configuration in which the resonant portion 711 forms, while facing the dielectric 751, the locking portion without covering the communication sheet. Therefore, the length of the resonant portion 711 in the lateral direction is preferably not too long. When the length of the resonant portion 711 in the lateral direction is long, the amount of an electromagnetic wave leaking into the air or the like increases, lowering the efficiency of the input into the communication sheet. Therefore, this is not preferred. Preferably, setting the length of the resonant portion 711 in the lateral direction to be about nine to ten millimeters allows a highly-efficient connector with low loss to be achieved.

A fitting depth 702 of the communication sheet and the electromagnetic wave interface device 700 is preferably not too much smaller than the wavelength of an electromagnetic wave to be transmitted and received. The part of the first electrode portion 710 that corresponds to the fitting depth 702 covers the communication sheet while facing the communication sheet so as to have a role of transmitting and receiving an electromagnetic wave to and from the communication sheet. The part of the first electrode portion 710 that corresponds to the fitting depth 702 transmits and receives an electromagnetic wave to and from the communication sheet by capacitive coupling and thus transmits and receives an electromagnetic wave in satisfactory and highly-effective manners as the oppositely covered area increases.

In other words, in relation to the wavelength of an electromagnetic wave to be transmitted and received, the fitting depth 702 of the communication sheet and the electromagnetic wave interface device 700 is preferably at least about one-tenth of the wavelength, more preferably at least about one-fourth of the wavelength, and even more preferably at least about the wavelength. This allows the electromagnetic wave interface device 700 to transmit and receive an electromagnetic wave with low loss to and from the communication sheet.

In other words, it is preferred because setting the fitting depth 702 of the communication sheet and the electromagnetic wave interface device 700 to be long allows a voltage standing wave ratio (VSWR) to be reduced down to be closer to about one. On the other hand, when the fitting length of the first electrode portion 710, which corresponds to the fitting depth 702, is short, the voltage standing wave ratio (VSWR) increases up to about two to three, and the efficiency is likely to be lowered. Thus, the short fitting length is not preferred.

Also in the electromagnetic wave interface device 700, the second electrode portion 720 may be formed by a plate-like or mesh-like conductor. Stated above is the explanation of a typical example of the electromagnetic wave interface 120 (5).

The reception antenna 520 (a dipole antenna for a 2-GHz band is used) was placed along the center line of the communication sheet 100(5) on the band-like communication sheet 100(5) as another interface device, and the transmission coefficient (S21) [db] between the electromagnetic wave interface 120(5) and the reception antenna 520 was measured for every one centimeter in an X direction. The measurement was taken in two ways of: when the electromagnetic wave absorbing member 110(5) is placed; and when the electromagnetic wave absorbing member 110(5) is not placed. The results of the measurement of the transmission coefficient (S22) with use of the network analyzer 510 are shown in FIG. 9. FIG. 9 is a diagram illustrating the measurement results of the measurement system 500 of the supporting experiment 1.

As shown in FIG. 9, it is found that the transmission coefficient of the standing wave was lowered from about 15 db to about 3 db when the electromagnetic wave absorbing member 110(5) was provided on one side. As shown in FIG. 9, it is found that transmission coefficients did not have uniquely small values 910 and 920 when the electromagnetic wave absorbing member 110(5) was provided and that almost uniform and large electromagnetic waves were thus obtained as a whole without depending on the position on the communication sheet 100(5).

In other words, the communication sheet 100(5) can transude an electromagnetic wave from the mesh-like conductor layer 130(5) evenly and highly-efficiently with low loss as a whole and allows for stable and highly-reliable communication with a communication device or the like mounted on the mesh-like conductor layer 130(5) in the predetermined transudation area. The communication sheet 100(5) reduces adverse effects of a reflected wave by resonance even when the communication sheet 100(5) is not provided with the electromagnetic wave absorbing member 110(5) on the two long sides thereof, thus achieving high efficiency while realizing low cost and a reduction in size and weight.

No other arbitrary member is prevented from being included or intervening between the members used in the explanations or the like of the above-stated embodiments. In reality, the above-stated relational expression based on a logical approximate calculation or the like in an ideal analysis model, etc. needs to have a characteristic relation that roughly satisfies the relational expression and to achieve the operations and effects resulting from the characteristic relation.

The communication sheets 100, 100(2), 100(3), and 100(4) are inventions related to a band-like communication sheet whose length of the width W is half of the wavelength of an electromagnetic wave. Compared to a conventional communication sheet, the communication sheets 100, 100(2), 100 (3), and 100(4) require much less number of necessary terminal members and have a property of having a large emission amount of an electromagnetic wave into the air.

The communication sheets 100, 100(2), 100(3), and 100(4) are shown to be preferred in a wireless LAN system or an RFID system. However, they are not limited to be used in these systems and can be used in an arbitrarily-modified configuration within the scope that is obvious.

INDUSTRIAL APPLICABILITY

According to the present invention, an electromagnetic wave transmission sheet or the like and electromagnetic wave transmission method can be provided that allow for highly-efficient transmission with low loss.

The invention claimed is:

1. A planar electromagnetic wave transmission sheet, comprising;
   a mesh-like electrode, wherein the width of the electromagnetic transmission sheet perpendicular to the traveling direction of a transmitted electromagnetic wave is substantially equal to a length obtained by multiplying a half of the wavelength of the transmitted electromagnetic wave by a natural number so that a resonance state is obtained in the width direction,
   wherein the electromagnetic wave transmission sheet creates a transudation area in which electromagnetic field of the transmitted electromagnetic wave exudes on the sheet;
      wherein the electromagnetic wave transmission sheet has a band-like shape and has long sides in the traveling direction of the transmitted electromagnetic wave and short sides in the width direction, and includes an input interface configured to input the transmitted electromagnetic wave so that the transmitted electromagnetic wave is transmitted in the traveling direction; and
      wherein an electromagnetic wave absorbing medium is provided on a first short side and the input interface is provided on a second short side that is different from the first short side;
   the electromagnetic wave absorbing medium configured to reduce reflection of the transmitted electromagnetic wave in the traveling direction, but not comprising:
      any of the electromagnetic wave absorbing medium configured to reduce reflection of the transmitted electromagnetic wave along the width direction.

2. The electromagnetic wave transmission sheet according to claim 1, wherein
   the transmitted electromagnetic wave is a plane wave.

3. A wireless LAN system comprising:
   the electromagnetic wave transmission sheet according to claim 1, configured to transmit a communication radio wave having the input interface connected to a wireless LAN access point; and
   a wireless LAN adapter configured to transmit and receive the communication radio wave with the electromagnetic wave transmission sheet.

4. An RFID system comprising:
   the electromagnetic wave transmission sheet according to claim 1, configured to transmit a communication radio wave having the input interface connected to an RFID reader/writer; and
   an RFID tag configured to transmit and receive the communication radio wave with the electromagnetic wave transmission sheet.

5. An electromagnetic wave transmission method of a planar electromagnetic wave transmission sheet provided with: a first conductor layer having a mesh-like conductor; a second conductor layer arranged substantially parallel to the first conductor layer; and a dielectric layer provided in between the first conductor layer and the second conductor layer, comprising:
   reflecting and trapping an electromagnetic wave within a width of the electromagnetic wave transmission sheet having a length obtained by multiplying a half of the wavelength of a transmitted electromagnetic wave by a whole number so that a resonance state is obtained in a width direction that is perpendicular to the transmission direction of the electromagnetic wave;
   allowing an electromagnetic wave absorbing member to absorb the electromagnetic wave so as to reduce the reflection in the transmission direction of the electromagnetic wave; and
   creating a transudation area in which the electromagnetic field of the transmitted electromagnetic wave exudes on the sheet;
   wherein the electromagnetic wave transmission sheet has a band-like shape and has long sides in the transmission direction of the transmitted electromagnetic wave and short sides in the width direction, and includes an input interface configured to input the transmitted electromagnetic wave so that the transmitted electromagnetic wave is transmitted in the transmission direction; and
   wherein the electromagnetic wave absorbing medium is provided on a first short side and the input interface is provided on a second short side that is different from the first short side.

* * * * *